US009477632B2

(12) United States Patent
Du

(10) Patent No.: US 9,477,632 B2
(45) Date of Patent: Oct. 25, 2016

(54) ACCESS PROXY FOR ACCESSING PERIPHERAL COMPONENT INTERCONNECT EXPRESS ENDPOINT DEVICE, PCIE EXCHANGER AND COMPUTER SYSTEM

(71) Applicant: Huawei Technologies Co., Ltd., Shenzhen (CN)

(72) Inventor: Ge Du, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/703,328

(22) Filed: May 4, 2015

(65) Prior Publication Data

US 2015/0234772 A1    Aug. 20, 2015

Related U.S. Application Data

(63) Continuation of application No. 14/297,959, filed on Jun. 6, 2014, which is a continuation of application No. 14/143,460, filed on Dec. 30, 2013, now Pat. No. 8,782,317, which is a continuation of application No. PCT/CN2013/075088, filed on May 2, 2013.

(51) Int. Cl.
*G06F 13/20* (2006.01)
*G06F 13/42* (2006.01)
(Continued)

(52) U.S. Cl.
CPC .......... *G06F 13/4221* (2013.01); *G06F 13/28* (2013.01); *G06F 13/385* (2013.01); *G06F 2213/0026* (2013.01); *G06F 2213/2802* (2013.01)

(58) Field of Classification Search
CPC ............... G06F 13/28; G06F 13/4031; G06F 13/4059; G06F 13/4027; G06F 13/385; G06F 9/4411
USPC ....... 710/8–19, 305–315, 300–304, 260–269
See application file for complete search history.

(56) References Cited

U.S. PATENT DOCUMENTS

| 5,630,076 A | 5/1997 | Saulpaugh et al. |
| 6,308,233 B1 | 10/2001 | Park |

(Continued)

FOREIGN PATENT DOCUMENTS

| CN | 1677341 A | 10/2005 |
| CN | 1723429 A | 1/2006 |

(Continued)

OTHER PUBLICATIONS

Notice of Allowance dated Mar. 6, 2014, 16 pages, U.S. Appl. No. 14/143,460, filed Dec. 30, 2013.
Foreign Communication From a Counterpart Application, European Application No. 13792568.1, Extended European Search Report dated Sep. 30, 2014, 5 pages.

(Continued)

*Primary Examiner* — Raymond Phan
(74) *Attorney, Agent, or Firm* — Conley Rose, P.C.; Grant Rodolph

(57) ABSTRACT

A computer system and a method are provided for accessing a peripheral component interconnect express (PCIe) endpoint device. The computer system includes a processor, a PCIe bus, and an access proxy. The access proxy connects to the processor and the PCIe endpoint device; the processor acquires an operation instruction, where the operation instruction instructs the processor to access the PCIe endpoint device through the access proxy, and send an access request to the access proxy according to the operation instruction; and the access proxy sends a response message of the access request to the processor after receiving the access request sent by the processor. Because the processor does not directly access the PCIe endpoint device to be accessed but completes access through the access proxy, thereby avoiding a machine check exception (MCE) reset for the processor.

16 Claims, 8 Drawing Sheets

(51) Int. Cl.
*G06F 13/28* (2006.01)
*G06F 13/38* (2006.01)

(56) References Cited

U.S. PATENT DOCUMENTS

| | | | |
|---|---|---|---|
| 7,546,487 | B2 | 6/2009 | Marisetty et al. |
| 8,141,094 | B2 | 3/2012 | Brown et al. |
| 8,782,317 | B1* | 7/2014 | Du .................. G06F 13/385 710/308 |
| 2004/0117670 | A1 | 6/2004 | Kurts et al. |
| 2004/0243768 | A1 | 12/2004 | Dodd et al. |
| 2005/0223177 | A1 | 10/2005 | Pentkovksi et al. |
| 2007/0011376 | A1 | 1/2007 | Gaskins |
| 2008/0147887 | A1 | 6/2008 | Freimuth et al. |
| 2008/0147937 | A1 | 6/2008 | Freimuth et al. |
| 2008/0219159 | A1 | 9/2008 | Chateau et al. |
| 2008/0256266 | A1 | 10/2008 | Okitsu et al. |
| 2009/0248947 | A1 | 10/2009 | Malwankar et al. |
| 2011/0055433 | A1 | 3/2011 | Kishore et al. |
| 2011/0264833 | A1 | 10/2011 | Zhang et al. |
| 2012/0137042 | A1 | 5/2012 | Wang et al. |

FOREIGN PATENT DOCUMENTS

| | | |
|---|---|---|
| CN | 1795441 A | 6/2006 |
| CN | 1881193 A | 12/2006 |
| CN | 101206621 A | 6/2008 |
| CN | 101206629 A | 6/2008 |
| CN | 101631083 A | 1/2010 |
| CN | 101763221 A | 6/2010 |
| JP | 2008502084 A | 1/2008 |
| JP | 2008065515 A | 3/2008 |
| WO | 2006012196 A2 | 2/2006 |
| WO | 2009120798 A2 | 10/2009 |
| WO | 2011022375 A1 | 2/2011 |

OTHER PUBLICATIONS

Foreign Communication From a Counterpart Application, Chinese Application No. 201380000957.X, Chinese Search Report dated Apr. 10, 2015, 7 pages.

Foreign Communication From a Counterpart Application, PCT Application No. PCT/CN2013/075088, English Translation of International Search Report dated Feb. 20, 2014, 2 pages.

Foreign Communication From a Counterpart Application, PCT Application No. PCT/CN2013/075088, Written Opinion dated Feb. 20, 2014, 6 pages.

Partial English Translation and Abstract of Japanese Patent Application No. JPA200865515, Dec. 30, 2015, 72 pages.

Partial English Translation and Abstract of Japanese Patent Application No. JPA2008502084, Dec. 30, 2015, 40 pages.

Foreign Communication From a Counterpart Application, Japanese Application No. 2015-514331, Japanese Office Action dated Dec. 8, 2015, 3 pages.

Foreign Communication From a Counterpart Application, Japanese Application No. 2015-514331, English Translation of Japanese Office Action dated Dec. 8, 2015, 4 pages.

PCI Express Base Specification, Revision 1.0, Apr. 29, 2002, 416 pages.

Foreign Communication From a Counterpart Application, European Application No. 13792568.1, European Office Action dated May 21, 2015, 4 pages.

Naito, R., "Definitive Explanation: The 13th PCI Express," Most Fundamental PCI Express Device Design—Learn through Express Device Design—Learn through experience, Interface, CQ Publishing Co., vol. 34, No. 4, Apr. 2010, pp. 170-178, 194.

Foreign Communication From a Counterpart Application, Japanese Application No. 2015-514331, Japanese Office Action dated Jun. 23, 2015, 3 pages.

Foreign Communication From a Counterpart Application, Japanese Application No. 2015-514331, English Translation of Japanese Office Action dated Jun. 23, 2015, 4 pages.

* cited by examiner

ACCESS PROXY FOR ACCESSING PERIPHERAL COMPONENT INTERCONNECT EXPRESS ENDPOINT DEVICE, PCIE EXCHANGER AND COMPUTER SYSTEM

CROSS-REFERENCE TO RELATED APPLICATIONS

This application is a continuation of U.S. patent application Ser. No. 14/297,959, filed on Jun. 6, 2014, which is a continuation of U.S. patent application Ser. No. 14/143,460, filed on Dec. 30, 2013, which is a continuation of International Application No. PCT/CN2013/075088, filed on May 2, 2013. The aforementioned patent applications are hereby incorporated by reference in their entireties.

TECHNICAL FIELD

Embodiments of the present invention relate to the field of computer technologies, and in particular to a method for accessing a peripheral component interconnect express endpoint device, a computer system, and an apparatus.

BACKGROUND

A Peripheral Component Interconnect Express (PCIe) is a high-performance system bus used on a calculation and communication platform. A PCIe bus is widely used in an interconnect system of a central processing unit (CPU) and a peripheral device and functions as a core service channel in a calculation and storage device. There may be multiple types of peripheral devices that interconnect with a CPU through a PCIe bus, such as a network interface card device or a solid state disk (SSD). Such devices are called PCIe endpoint devices in this document.

A PCIe bus is widely used as a bus interface of a server or a storage system. During normal running of a system, a PCIe endpoint device needs to be added or removed in a non-power-off condition because of an online capacity expansion and maintenance demand, that is, a hot swap demand. Current PCIe hot swap complies with the following operation process: an operator initiates a hot swap request by pressing a button; after learning a hot swap event, a hot swap controller notifies all drives that may access the PCIe endpoint device to stop accessing the PCIe endpoint device, and uninstalls resources of the PCIe endpoint device on which the hot swap needs to be performed; and then the PCIe endpoint device is powered off and the operator removes the PCIe endpoint device.

Advance notification is required for the current hot swap of a PCIe endpoint device so as to ensure normal running of the system. However, in recent years, the PCIe bus is gradually developed from intra-system interconnection to inter-system interconnection, and applications, such as external cables, increase. The cables easily disconnect abnormally, and therefore a condition that a PCIe endpoint device is abnormally offline without advance notification occurs. In addition, a scenario that a user uses a SSD to directly connect to a system occurs more and more widely. The user may directly insert or remove the SSD disk without advance notification due to a user habit factor. For the mentioned condition that the PCIe endpoint device is offline abnormally and suddenly, if the CPU has initiated read and write instructions to the PCIe endpoint device, the relevant instructions will stay in a state of waiting to be done; and when instructions for accessing the PCIe endpoint device from the CPU continuously accumulate to a certain degree, the CPU regards the entire system as abnormal and reports a machine check exception (MCE) error. As a result, a reset of the entire system is caused.

SUMMARY

Embodiments of the present invention put forward a method for accessing a PCIe endpoint device, a computer system, and an apparatus, to avoid a reset generated by a processor after a PCIe endpoint device is offline abnormally.

In a first aspect, an embodiment of the present invention provides a computer system, including a processor; and a PCIe bus configured to connect a PCIe endpoint device, where the computer system further includes an access proxy and the access proxy connects to the processor and the PCIe endpoint device; the processor is configured to acquire an operation instruction, where the operation instruction instructs the processor to access the PCIe endpoint device using the access proxy; and send an access request to the access proxy according to the operation instruction, where the access request instructs the access proxy to access the PCIe endpoint device; and the access proxy is configured to send a response message of the access request to the processor after receiving the access request sent by the processor.

With reference to the first aspect, in a first possible implementation manner, the computer system further includes a drive module of the PCIe endpoint device configured to generate the operation instruction according to a preset interface for accessing the PCIe endpoint device, where the preset interface for accessing the PCIe endpoint device points to the access proxy; and the processor is configured to acquire the operation instruction generated by the drive module for the PCIe endpoint device.

With reference to the first aspect, in a second possible implementation manner, the computer system further includes a drive module of a PCIe endpoint device and a host operating system (HOS), where the drive module for the PCIe endpoint device is configured to invoke the HOS so as to access the PCIe endpoint device; the HOS receives in response to the invoking by the drive module for the PCIe endpoint device, and generates the operation instruction according to the preset interface for accessing the PCIe endpoint device and the preset interface for accessing the PCIe endpoint device points to the access proxy; and the processor is configured to acquire the operation instruction generated by the HOS.

With reference to the first aspect, the first possible implementation manner of the first aspect, or the second possible implementation method of the first aspect, in a third possible implementation method, the access proxy is further configured to perform access to the PCIe endpoint device according to the access request.

In a second aspect, a method for accessing a PCIe endpoint device is provided, where the PCIe endpoint device connects to a processor of a computer system through a PCIe bus, including acquiring, by the processor, an operation instruction, where the operation instruction instructs the processor to access the PCIe endpoint device using an access proxy; sending, by the processor, an access request to the access proxy according to the operation instruction, where the access request instructs the access proxy to access the PCIe endpoint device; and receiving, by the processor, a response message of the access request sent by the access proxy.

With reference to the second aspect, in a first possible implementation manner, the processor acquires the operation instruction generated by a drive module of the PCIe endpoint device according to a preset interface for accessing the PCIe endpoint device, where the preset interface for accessing the PCIe endpoint device points to the access proxy; alternatively, the processor acquires the operation instruction generated by a HOS according to the preset interface for accessing the PCIe endpoint device, where the preset interface for accessing the PCIe endpoint device points to the access proxy. With reference to the second aspect or the first possible implementation manner of the second aspect, in a second possible implementation manner, the operation instruction instructs the processor to access the PCIe endpoint device using a direct memory access (DMA) engine; and the processor sends a data migration request to the DMA engine according to the operation instruction, where the data migration request instructs the DMA engine to migrate specific data in a memory of the PCIe engine to a memory of the computer system or migrate specific data in the memory of the computer system to the memory of the PCIe endpoint device.

With reference to the second aspect, the first possible implementation manner of the second aspect, or the second possible implementation method of the second aspect, in a third possible implementation manner, the method further includes receiving, by the processor, a first notification message sent by the access proxy, where the first notification message indicates that the access proxy accesses the PCIe endpoint device successfully; and acquiring, by the processor, an access result according to the first notification message.

With reference to the second aspect, the first possible implementation manner of the second aspect, or the second possible implementation method of the second aspect, in a fourth possible implementation manner, the method further includes receiving, by the processor, a second notification message sent by the access proxy, where the second notification message indicates that the access proxy fails to access the PCIe endpoint device; and executing, by the processor, subsequent processing for an access failure according to the second notification message.

With reference to the fourth possible implementation method of the second aspect, in a fifth possible implementation method, the subsequent processing of the access failure includes determining, by the processor, a reason for the access proxy failing to access the PCIe endpoint device, and if the reason of the access failure is that the PCIe endpoint device to be accessed is offline abnormally, stopping, by the processor, access to the PCIe endpoint device.

In a third aspect, a computer is provided, including a processor; and a memory configured to store a computer execution instruction, where, when the computer is running, the processor executes the computer execution instruction stored in the memory and communicates with an external device of the computer through a communications interface, so that the computer executes a method for accessing a PCIe endpoint device according to the second aspect.

In a fourth aspect, a computer-readable medium is provided, including a computer execution instruction, where a computer executes a method for accessing a PCIe endpoint device according to the second aspect when a processor of the computer executes the computer execution instruction.

In a fifth aspect, a method for accessing a PCIe endpoint device is provided, where the PCIe endpoint device connects to a processor of a computer system through a PCIe bus, including receiving an invoking instruction, where the invoking instruction indicates that the PCIe endpoint device needs to be accessed; and generating an operation instruction according to a preset interface for accessing the PCIe endpoint device, where the preset interface for accessing the PCIe endpoint device points to an access proxy, and the operation instruction is used to instruct the processor to access the PCIe endpoint device using the access proxy.

In a sixth aspect, an apparatus for accessing a PCIe endpoint device is provided, including a receiving module configured to receive an invoking instruction, where the invoking instruction indicates that the PCIe endpoint device needs to be accessed; and a generating module configured to generate, according to a preset interface for accessing the PCIe endpoint device, an operation instruction for accessing the PCIe endpoint device, where the preset interface for accessing the PCIe endpoint device points to the access proxy, and the operation instruction is used to instruct the processor to access the PCIe endpoint device using the access proxy.

In a seventh aspect, a computer is provided, including a processor, and a memory configured to store a computer execution instruction, where, when the computer is running, the processor executes the computer execution instruction stored in the memory, so that the computer executes the following method: receiving an invoking instruction, where the invoking instruction indicates that the PCIe endpoint device needs to be accessed; and generating, according to a preset interface for accessing the PCIe endpoint device, an operation instruction for accessing the PCIe endpoint device, where the preset interface for accessing the PCIe endpoint device points to the access proxy, and the operation instruction is used to instruct the processor to access the PCIe endpoint device using the access proxy.

In an eighth aspect, a computer-readable medium is provided, including a computer execution instruction, where the computer executes the following method when a processor of a computer executes the computer execution instruction: receiving an invoking instruction, where the invoking instruction indicates that the PCIe endpoint device needs to be accessed; and generating, according to a preset interface for accessing the PCIe endpoint device, an operation instruction for accessing the PCIe endpoint device, where the preset interface for accessing the PCIe endpoint device points to the access proxy, and the operation instruction is used to instruct the processor to access the PCIe endpoint device using the access proxy.

In a ninth aspect, an access proxy is provided, where the access proxy applies to a computer system, the computer system includes a processor and a PCIe bus, and the PCIe bus connects to at least one PCIe endpoint device; the access proxy connects to the processor and the PCIe endpoint device; and the access proxy is configured to isolate a direct access between the processor and the PCIe endpoint device, receives a request for accessing the PCIe endpoint device from the processor, and returns a response message of the access request to the processor.

In a tenth aspect, an PCIe exchanger is provided, where the PCIe exchanger applies to a computer system, the computer system includes a processor and a PCIe bus, and the PCIe bus connects to at least one PCIe endpoint device; an upstream port of the PCIe exchanger connects to the processor through the PCIe bus and a downstream port of the PCIe exchanger connects to the PCIe endpoint device through the PCIe bus; and the access proxy according to the ninth aspect is built in the PCIe exchanger.

In an eleventh aspect, a method for allocating resources to a PCIe endpoint device that accesses a computer system is provided, including reserving, a specific share of resources for each port for accessing the PCIe endpoint device, where the specific share is greater than or equal to a required resource quantity of the PCIe endpoint device; and allocating, according to the reserved specific share of resources, the reserved specific share of resources to each port for accessing the PCIe endpoint device.

According to the eleventh aspect, in a first implementation manner, the specific share is a required resource quantity of a type of PCIe endpoint that has a maximum resource quantity demand.

According to the eleventh aspect or the first possible implementation manner of the eleventh aspect, in a second possible implementation manner, the PCIe endpoint device that accesses the computer system and a processor constitute a PCIe field, where the PCIe field is configured with a corresponding PCIe tree; and the method further includes recording, in the PCIe tree, the specific share of resources allocated to each port for accessing the PCIe endpoint device.

According to the second possible implementation manner of the eleventh aspect, in a third possible implementation manner, the method includes, when each PCIe endpoint device is offline from the computer system, reserving the specific share of resources that are allocated to each port for accessing the PCIe endpoint device and are recorded in the PCIe tree.

In a twelfth aspect, a computer system is provided, including a processor; and a PCIe bus configured to connect a PCIe endpoint device; a basic input-output system (BIOS) configured to reserve a specific share of resources for each port for accessing the PCIe endpoint device, where the specific share is greater than or equal to a required resource quantity of the PCIe endpoint device; and a PCIe management module configured to allocate, according to the specific share of resources reserved by the BIOS, the reserved specific share of resources to each port for accessing the PCIe endpoint device.

In embodiments of the present invention, a processor no longer directly accesses a PCIe endpoint device to be accessed but completes access using an access proxy. The access proxy is capable of isolating an impact brought by abnormal offline of the PCIe endpoint device and returning a response message of an access request to the processor, so that tasks cached on the processor do not accumulate due to timeout and therefore the processor avoids an MCE reset.

In the embodiments of the present invention, the system reserves and allocates a specific share of resources to a port for accessing a PCIe endpoint device, so that the processor does not scan the PCIe endpoint device when the PCIe endpoint device accesses the system. This avoids a reset of the entire system caused by an MCE error that may occur when the PCIe endpoint device accesses the computer system.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method for accessing a PCIe endpoint device, a computer system, and an apparatus. When a hot swap operation needs to be performed on a PCIe endpoint device, a system may not be notified in advance of preprocessing and a connection between the PCIe endpoint device and a processor is directly disconnected. At this time, an MCE reset risk does not occur on the processor. In the embodiments of the present invention, a condition that the PCIe endpoint device is directly removed from the system or is offline due to a fault is collectively called abnormal offline of the PCIe endpoint office.

System Architecture in an Embodiment of the Present Invention

Figure 1:
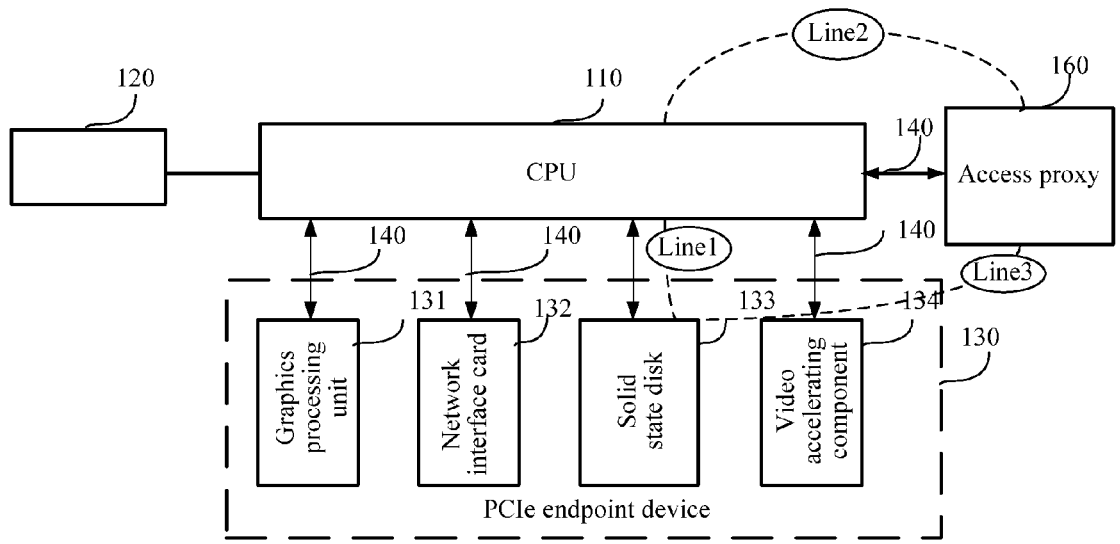
FIG. 1 is a composition diagram of a computer system according to an embodiment of the present invention.

FIG. 1 is a composition diagram of a computer system according to an embodiment of the present invention. The computer system shown in FIG. 1 includes a CPU 110, a memory 120, and a PCIe endpoint device 130. The PCIe endpoint device 130 connects to the CPU 110 through a PCIe bus 140 and may be inserted into or removed from the computer system. The PCIe endpoint device 130 includes multiple types, such as a graphics processing unit 131, a network interface card 132, a SSD 133, and a video accelerating component 134. The memory 120 is configured to store data, where the stored data may be data acquired by the CPU from an external device or may further be program data that enables the CPU to run. Further, one or more program modules may be stored in the memory, and the CPU 110 performs a related operation according to a computer execution instruction of a program module. The PCIe endpoint device 130 and the CPU 110 in the computer system shown in FIG. 1 constitute a PCIe field, and all devices in the PCIe field connect the CPU 110 through the PCIe bus 140 and are controlled by the CPU 110.

Figure 2:
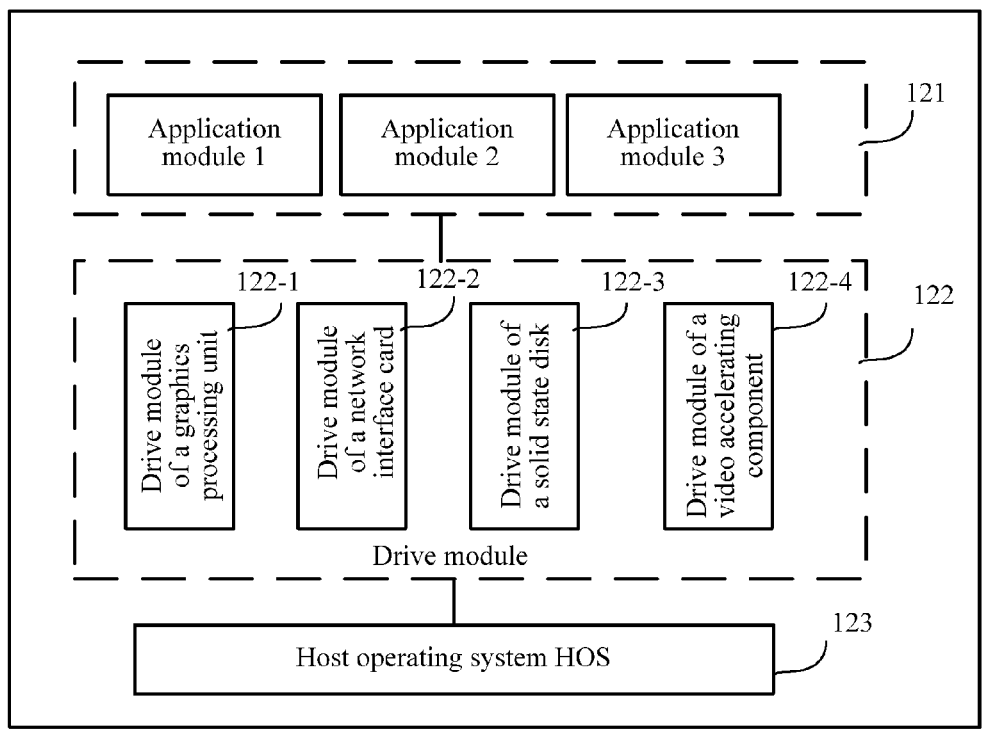
FIG. 2 is a composition diagram of program modules included in a memory according to an embodiment of the present invention.

In the system architecture shown in FIG. 1, as shown in FIG. 2, the program modules in the memory 120 may include an application module 121, a drive module 122, and a HOS 123. The application module 121 generates a demand for accessing a PCIe endpoint device. The drive module 122 may invoke a corresponding interface of the HOS 123 (if an access interface is provided by the HOS) according to the demand of the application module for accessing the PCIe endpoint device. The HOS 123 generates an operation instruction according to in response to the invoking by the drive module, so that the CPU accesses or controls the corresponding PCIe endpoint device according to the operation instruction. Generally speaking, one PCIe endpoint device corresponds to one drive module (certainly it is possible that one drive module corresponds to multiple PCIe endpoint devices as long as it is ensured that each PCIe endpoint device is equipped with a corresponding drive module). For example, according to the system architecture shown in FIG. 1, drive modules of the PCIe endpoint devices in the memory 120 may include a drive module 122-1 of the graphics processing unit, a drive module 122-2 of the network interface card (NIC), a drive module 122-3 of the SSD, and a drive module 122-4 of the video accelerating component.

For example, if the application module generates a demand for accessing an SSD, according to a current method for accessing a PCIe endpoint device by the CPU, the drive module 122-3 of the SSD invokes the HOS 123 after receiving in response to the invoking by the application module 121; the HOS 123 generates an operation instruction to the CPU 110 according to a default configured access interface, where the operation instruction includes an instruction of the device SSD 133 to be accessed and a related operation requirement; the CPU 110 sends an access request to the SSD 133 according to the operation instruction of the drive module 122-3 of the SSD, so as to require access to a register of the SSD 133; if the SSD 133 is offline abnormally, the CPU 110 will not receive a response message of the access request of the CPU 110 from the SSD 133, and at this time, the CPU regards the access task as incomplete; and if such incomplete tasks accumulate to a certain degree on the CPU, the CPU regards the entire system as abnormal and reports an MCE error for resetting.

In this embodiment of the present invention, the method for accessing a PCIe endpoint device by the CPU is changed. The CPU no longer directly accesses the PCIe endpoint device but accesses the PCIe endpoint device using a third party. As shown in FIG. 1, an access proxy 160 is newly added in the system in this embodiment of the present invention, where the access proxy 160 is used on behalf of the CPU 110 to access the PCIe endpoint device and isolate an impact of abnormal offline of the PCIe endpoint device on the CPU 110. As shown in FIG. 1, the CPU 110 no long uses line 1 to access the SSD 133 but uses line 2 and line 3 (line 1 is Line 1 shown in the figure, line 2 is Line 2 shown in the figure, line 3 is Line 3 shown in the figure, and dashed lines of Line 1-3 shown in the figure are not actual connections but are only used to visually illustrate signal flow lines among each composition module). The CPU 110 firstly acquires the operation instruction, where the operation instruction instructs the CPU to access the SSD 133 using the access proxy 160. Then, the CPU 110 sends the access request to the access proxy 160 through line 2. The access proxy 160 returns a response message of the access request to the CPU 110 through line 2. Subsequently, the access proxy performs access to the PCIe endpoint device according to the access request, that is, performs read and write operations on the register of the SSD 133 through line 3. In this way, in one aspect, because the CPU 110 does not generate a direct signal relationship with the PCIe endpoint device 130, it is invisible to the CPU 110 whether the PCIe endpoint device 130 is offline, that is, the PCIe endpoint device does not affect service processing of the CPU 110; in another aspect, the access proxy 160 provided by this embodiment of the present invention is capable of returning a response message to the CPU 110 after receiving the access instruction from the CPU 110, so that the corresponding response message can always be received for the access request sent by the CPU 110. Therefore, access tasks of the CPU 110 do not accumulate due to incompletion of the tasks, no MCE error is generated, and a system reset initiated by the CPU is avoided.

In this embodiment of the present invention, the method for accessing a PCIe endpoint device by the CPU may be changed by upgrading or improving of a drive module corresponding to the PCIe endpoint device. When it is implemented by reconstructing the drive module corresponding to the PCIe endpoint device, an access interface is preset in the drive module corresponding to the PCIe endpoint device, where the preset access interface points to the access proxy; and when the drive module corresponding to the PCIe endpoint device determines that it needs to access the PCIe endpoint device, the drive module for the PCIe endpoint device generates an operation instruction of the CPU according to the preset access interface, where the operation instruction instructs the CPU to access the PCIe endpoint device using the access proxy.

In addition, changing of the method for accessing a PCIe endpoint device by the CPU may has another implementation method. For example, the changing is implemented by modifying the HOS. An access interface is preset on the HOS, where the preset access interface points to the access proxy. When determining that access to the PCIe endpoint device is required, the drive module for the PCIe endpoint device still invokes the HOS to access the PCIe endpoint device. After the HOS receives the invoking instruction sent by the drive of the PCIe endpoint device, because the interface for accessing the PCIe endpoint device configured on the HOS has been preset to the access proxy, the HOS generates the operation instruction, where the operation instruction instructs the CPU to access the PCIe endpoint device using the access proxy.

The following describes functions and detailed implementation forms of the access proxy according to this embodiment of the present invention. The access proxy according to this embodiment of the present invention includes an isolating function and an access proxy function. Functioning as an isolating module, the access proxy needs to ensure its independence from the PCIe endpoint device and also needs to ensure its independence from the CPU. To maintain the independence from the PCIe endpoint device, it needs to be ensured that the access proxy is not directly removed with the PCIe endpoint device, and therefore the access proxy and the PCIe endpoint device need to belong to different devices in physical settings; to maintain the independence from the CPU, it is mainly ensured that the access proxy has an independent processor. When the processor of the access proxy is independent from the CPU of the system, even if the PCIe endpoint device is directly removed, an impact on the access proxy module will not infect the CPU. Functioning as a proxy module, the access proxy needs to implement access to the PCIe endpoint device and return a response message of an access request received from the CPU, where the response message of the access request may be a confirmation response, a rejection response, or a failure response. However, regardless of any kind of a response message, the message indicates to the CPU that the access request sent by the CPU has been received. The CPU determines that a current task is complete after receiving the response message and may shut off a timer initiated for the task. In this way, a task timeout shutoff mechanism of the CPU keeps normal and other messages cached on the CPU do not accumulate due to timeout, thereby avoiding an MCE reset generated by the CPU.

Based on the consideration of functions of the access proxy, the access proxy in the system may also be set in multiple forms. In system architecture shown in FIG. 1, the access proxy 160 is set in the computer system as an independent and newly added device, and the access proxy connects to the CPU and the PCIe endpoint device through the PCIe bus. In addition, the access proxy 160 may also be packaged with an existing device in the PCIe field for implementation. For example, the access proxy 160 is packaged with the CPU as firmware.

The access proxy in this embodiment of the present invention may be implemented using existing hardware. For example, the access proxy is implemented using a DMA engine. The access proxy may also be implemented using new hardware. For example, a software module that has an access proxy function is installed on a hardware device that has an independent processor.

Because the access proxy in this embodiment of the present invention needs to return the response message of the access request to the CPU, during specific implementation, there are different manners to implement the function of the access proxy. One of the implementation manners is that a connection relationship between the access proxy and the CPU is ensured to be in a holding state, that is, the connection relationship between the two will not be disconnected, or the access proxy is not hot swappable for the CPU. For example, a hardware device on which the access proxy is loaded or a hardware device that is used to implement the access proxy is soldered on a printed circuit board (PCB) connecting to the CPU, or an interface for connecting the hardware device on which the access proxy is loaded or the hardware device that is used to implement the access proxy and the processor is fixed using a connector.

Figure 3:
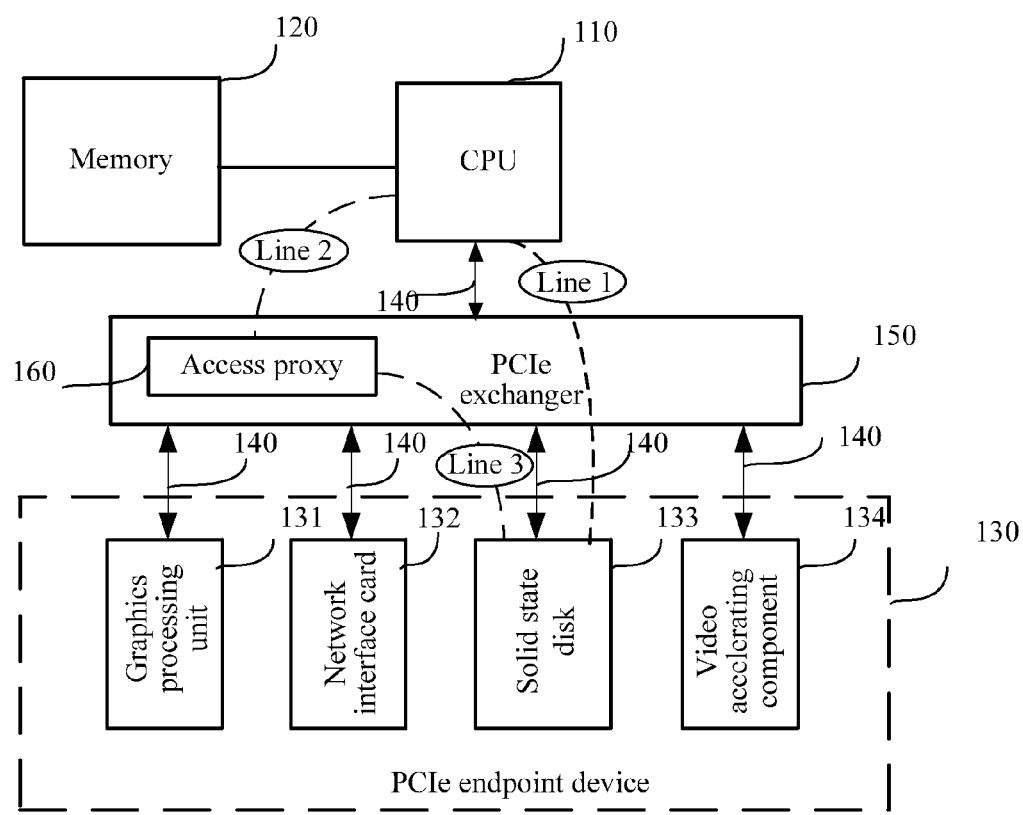
FIG. 3 is a composition diagram of another computer system according to an embodiment of the present invention.

FIG. 3 illustrates a computer system according to another embodiment of the present invention.

In the computer system shown in FIG. 3, except a CPU, a PCIe bus, and a PCIe endpoint device shown in FIG. 1, a PCIe exchanger 150 is further included. An upstream port of the PCIe exchanger 150 connects to the CPU 110 through a PCIe bus 140 and a downstream port provides a PCIe port for each PCIe endpoint device, where each PCIe port connects to each PCIe endpoint device through the PCIe bus 140. The PCIe exchanger 150 is configured to downstream route data to a corresponding PCIe port and upstream route data from each independent PCIe port to the CPU 110. In the embodiment shown in FIG. 3, a newly added access proxy 160 is set within the PCIe exchanger 150, and the access proxy 160 in this embodiment is implemented using a DMA engine. The PCIe endpoint device 130 connects to the PCIe exchanger 150 through the PCIe bus 140. Because the PCIe exchanger 150 and the PCIe endpoint device 130 belong to different devices, direct removal of any PCIe endpoint device does not cause removal of the PCIe exchanger 150 from the system, that is, it is ensured that the access proxy 160 is not removed with the removal of the PCIe endpoint device, thereby implementing independence of the access proxy 160 and that of the PCIe endpoint device 130. In addition, in this embodiment, because the DMA engine has an independent processor, if any PCIe endpoint device is directly removed and even access to the PCIe endpoint device from the DMA is affected, the DMA isolates the impact. Regardless of whether access to the PCIe endpoint device is successful, it is ensured that the DMA returns, to the CPU 110, a response message of an access request sent by the CPU 110, thereby avoiding a problem of an MCE reset initiated by the CPU.

It is still used as an example that an application module generates a demand for accessing an SSD 133. The CPU 110 acquires an operation instruction generated by a drive module 122-3 of the SSD, where the operation instruction instructs the CPU 110 to access the SSD 133 using the DMA. The CPU 110 sends a data migration request to the DMA according to the operation instruction of the drive module 122-3 of the SSD, where the data migration request instructs the DMA engine to migrate specific data in a memory of the PCIe endpoint device to a memory of the computer system or migrate specific data in the memory of the computer system to the memory of the PCIe endpoint device. After receiving the data migration request of the CPU 110, the DMA returns a response message of the data migration request to the CPU 110, performs data migration on the SSD 133, and after the data migration is complete, returns a notification message of access completion to the CPU 110, so as to instruct the CPU 110 to acquire a result of the access.

Further, because the DMA in this embodiment of the present invention is built in the PCIe exchanger 150, the PCIe exchanger 150 may further be soldered on a PCB connecting to the CPU 110, or an interface for connecting the PCIe exchanger 150 and the CPU 110 is fixed using a connector. This ensures that the DMA built in the PCIe exchanger 150 is not removed from the system and therefore ensures that the DMA is always capable of returning a response message of an access request to the CPU.

Figure 4:
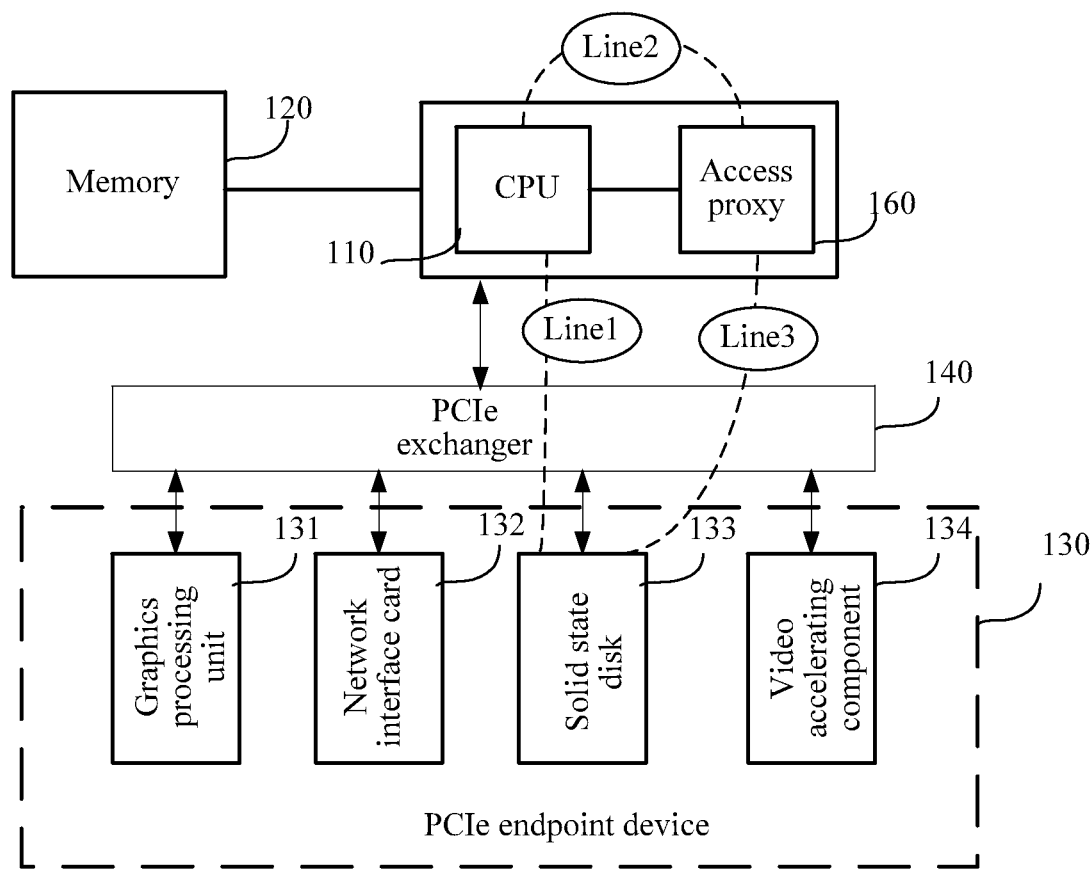
FIG. 4 is a composition diagram of another computer system according to an embodiment of the present invention.

FIG. 4 illustrates a computer system according to another embodiment of the present invention.

In the embodiment shown in FIG. 4, it is different from the embodiment shown in FIG. 3 that an access proxy 160 is newly added in a CPU 110, where the access proxy 160 may be implemented using a DMA engine. The access proxy 160 is bound with the CPU 110, that is, it is ensured that the access proxy 160 is not removed with removal of a PCIe endpoint device, thereby implementing independence of the access proxy 160 and that of the PCIe endpoint device 130. In addition, in this embodiment, because the DMA engine has an independent processor, if any PCIe endpoint device is directly removed and even access to the PCIe endpoint device from the DMA is affected, the DMA isolates the impact so that the CPU 110 is not infected. Regardless of whether access to the PCIe endpoint device is successful, it is ensured that the DMA returns, to the CPU 110, a response message of an access request sent by the CPU 110, thereby avoiding a problem of an MCE reset initiated by the CPU. A detailed access method in this embodiment is consistent with those described in the embodiments shown in FIG. 1 and FIG. 3, and therefore no further details are provided herein.

A method for accessing a PCIe endpoint device in the embodiments of the present invention may be implemented in a computer system shown in FIG. 1, FIG. 3, or FIG. 4. However, what is shown in FIG. 1, FIG. 3, or FIG. 4 is only an example that applies to the embodiments of the present invention but is not a specific limitation on an application of the present invention. Other system embodiments or application scenarios are not described in this application document. In addition, settings of an access proxy in a system shown in FIG. 1, FIG. 3, or FIG. 4 are only examples. Those skilled in the art may further set the newly added access proxy in the embodiments of the present invention to another position in the system or use another technical means for implementation according to a technical principle of the embodiments of the present invention.

The CPU 110 shown in FIG. 1, FIG. 3, or FIG. 4 is also only an example. For example, it may further be a specific integrated circuit. No matter in which form, it implements a processor function in a computer system. The computer system in the embodiments of the present invention may be a computational server, or may be a server that manages routes, such as a switch. A detailed implementation form of the computer system is not limited in this embodiment of the present invention.

Process for Accessing a PCIe Endpoint Device

Figure 5:
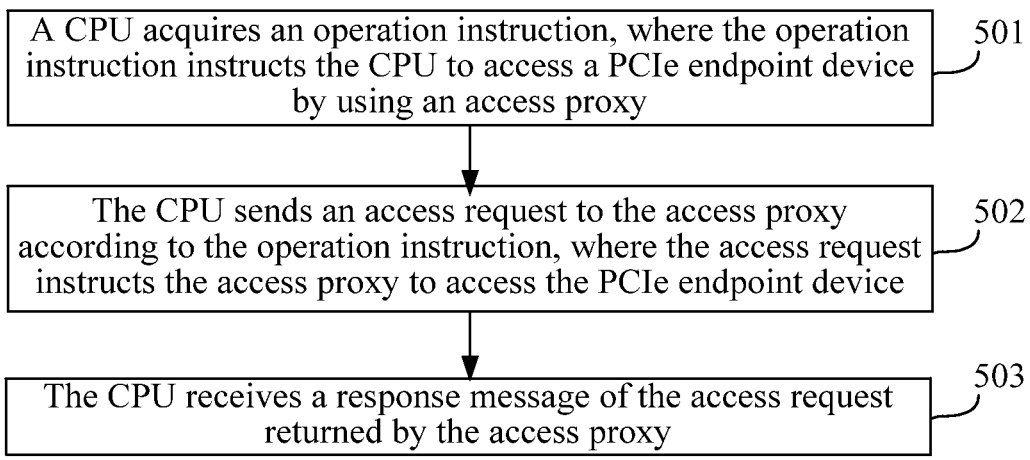
FIG. 5 is a flowchart of a method according to an embodiment of the present invention.

The following describes a process for accessing a PCIe endpoint device according to an embodiment of the present invention, where the process is implemented by a newly added access proxy in a computer system. As shown in FIG. 5, a process for accessing a PCIe endpoint device in this embodiment of the present invention includes the following steps:

501: A CPU acquires an operation instruction, where the operation instruction instructs the CPU to access the PCIe endpoint device using the access proxy in the computer system.

The operation instruction may be generated by a drive module of the PCIe endpoint device. Because the drive module for the PCIe endpoint device has preset an interface for accessing the PCIe endpoint device as the access proxy, when an upper layer application module generates a demand for accessing a PCIe endpoint device, the drive module for the PCIe endpoint device generates an operation instruction for accessing the PCIe endpoint device, where the operation instruction instructs the CPU to access the PCIe endpoint device to be accessed using the access proxy in the computer system. Alternatively, the operation instruction may also be generated by a HOS in the computer system. The HOS has preset the interface for accessing the PCIe endpoint device as the access proxy. When the upper layer application module generates a demand for accessing a PCIe endpoint device, the drive module for the PCIe endpoint device invokes the HOS and the HOS generates the operation instruction according to the preset access interface, where the operation instruction instructs the CPU to access the PCIe endpoint device to be accessed using the access proxy in the computer system.

502: The CPU sends an access request to the access proxy according to the operation instruction, where the access request instructs the access proxy to access the PCIe endpoint device.

503: The access proxy returns a response message of the access request to the CPU after receiving the access request sent by the CPU.

The response message of the access request may be a confirmation response, a rejection response, or a failure response. However, regardless of any kind of response message, the message indicates to the CPU that the access request sent by the CPU has been received. The CPU determines that a current task is complete after receiving the response message and may shut off a timer initiated for the task. In this way, a task timeout shutoff mechanism of the CPU keeps normal.

In the process, a CPU does not directly access a PCIe endpoint device to be accessed but completes access using an access proxy. The access proxy is capable of isolating an impact brought by abnormal offline of the PCIe endpoint device and the access proxy returns a response message of an access request to the CPU, so that tasks cached on the CPU do not accumulate due to timeout, thereby avoiding an MCE reset for the CPU.

Figure 6:
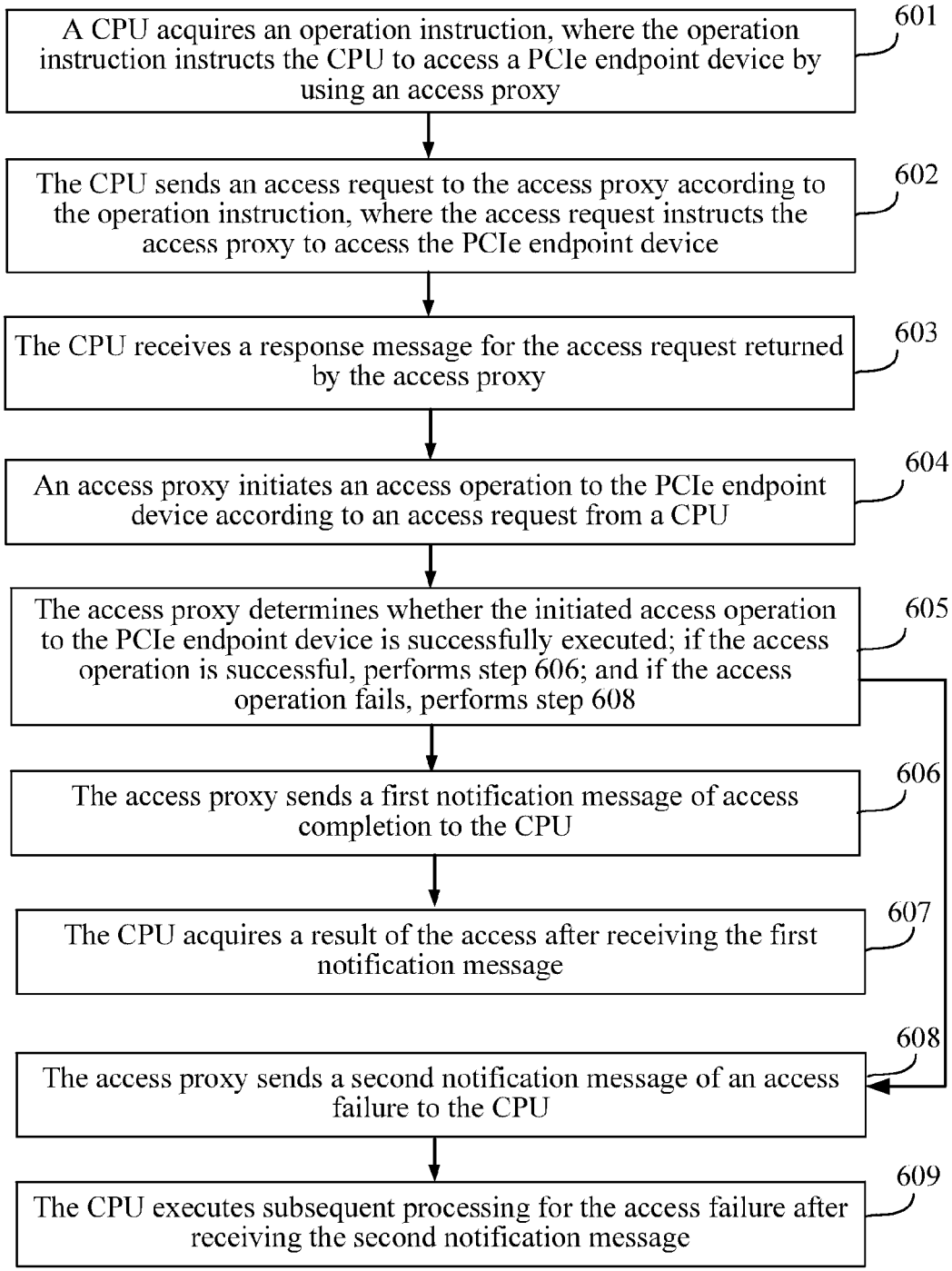
FIG. 6 is a flowchart of another method according to an embodiment of the present invention.

Further, as shown in FIG. 6, in another process embodiment of the present invention, a process for an access proxy to access a PCIe endpoint device includes the following steps:

601-603: These steps are the same as the steps 501-503 and therefore no further details are provided herein.

604: The access proxy initiates an access operation to the PCIe endpoint device according to the access request from the CPU.

605: The access proxy determines whether the access operation initiated to the PCIe endpoint device is successfully executed; if the access operation is successful, performs step 606; and if the access operation fails, performs step 608.

606: The access proxy sends a first notification message of access completion to the CPU.

607: The CPU acquires a result of the access after receiving the first notification message.

The CPU may further notify an upper layer module of completion of the access according to the access result.

608: The access proxy sends a second notification message of an access failure to the CPU.

609: The CPU executes subsequent processing for the access failure after receiving the second notification message.

The subsequent processing for an access failure includes determining a reason for the access proxy failing to access the PCIe endpoint device; if the reason of the access failure is that the PCIe endpoint device to be accessed is offline abnormally, stopping, by the CPU, access to the PCIe endpoint device; and if the reason of the access failure is that the access proxy fails, resetting, by the CPU, the access proxy, or sending a notification indicating that the access proxy is faulty, so as to rectify the fault of the access proxy.

After stopping the access to the PCIe endpoint device, the CPU may further notify the upper layer module to stop access to the PCIe endpoint device.

The process describes a method for accessing a PCIe endpoint device in this embodiment of the present invention. In the method, an access proxy, in place of the CPU, accesses the PCIe endpoint device and returns a response message of an access request to the CPU, thereby avoiding a reset of the entire system caused by an MCE error that is generated by the CPU. Further, when the access proxy fails to access the PCIe endpoint device, the access proxy notifies the CPU of a message of an access failure. The CPU performs a fault diagnosis and when determining the access failure is caused by abnormal offline of the PCIe endpoint device to be accessed, stops access to the PCIe endpoint device to be accessed, thereby avoiding a waste of resources that is caused when the system continues to perform repeated access that cannot be successful.

Figure 7:
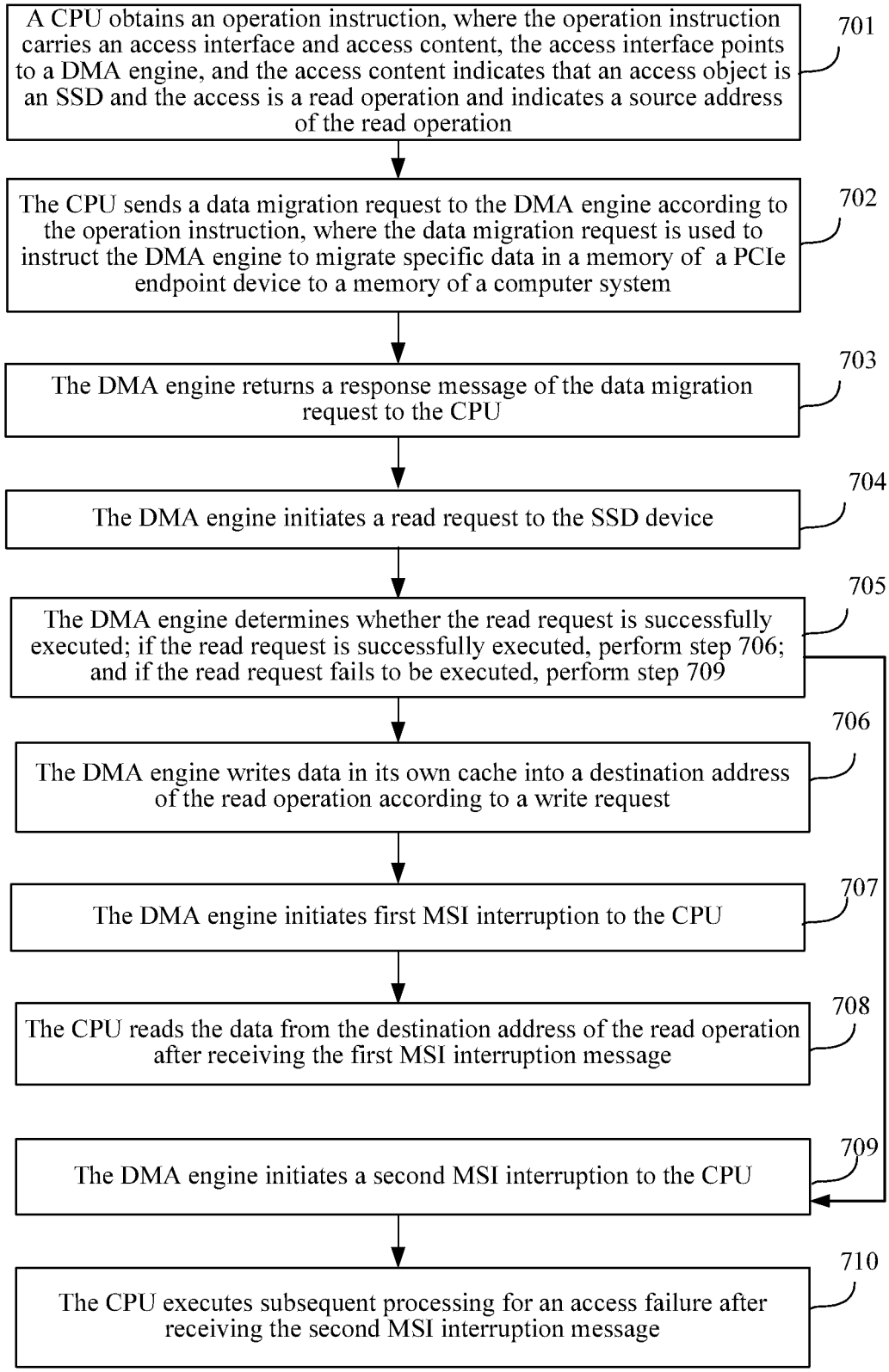
FIG. 7 is a flowchart of another method according to an embodiment of the present invention.

In combination of the embodiment of a computer system shown in FIG. 3 or FIG. 4, when an access proxy is implemented using a DMA engine, an upper layer application module generates a read operation demand for an SSD, a specific access process is shown in FIG. 7, including the following steps:

701: A CPU in a computer system obtains an operation instruction, where the operation instruction carries an access interface and access content, the access interface points to the DMA engine, the access content indicates that an access object is the SSD and the access is a read operation and indicates a source address of the read operation; and the access content may further indicate a length of the read operation but generally the length of the read operation may be subject to a default length in the system.

When an upstream endpoint generates a read operation demand for the SSD device, a drive module of the SSD device receives in response to the invoking by the upstream endpoint, and generates an operation instruction for accessing a PCIe endpoint device according to a preset access interface.

A detailed implementation method of the operation instruction sent by the drive module to the CPU may further be in another manner. For example, the operation instruction carries indications indicating that the access object is the SSD and the access is a read operation and indicating a start address of the read operation; in addition, one indication is newly added in the operation instruction to instruct access to the SSD to be implemented by operating the DMA engine.

702: The CPU sends a data migration request to the DMA engine according to the operation instruction, where the data migration request is used to instruct the DMA engine to migrate specific data in a memory of the PCIe endpoint device to a memory of the computer system.

After acquiring the operation instruction of the drive module of the SSD, the CPU applies to the memory of the computer system for a destination address of the read operation and sends the data migration request to the DMA engine after acquiring the destination address of the read operation, where the data migration request indicates the source address, the destination address, and the length of the read operation, so as to instruct the DMA engine to migrate data of the length of the read operation from the source address of the read operation to the destination address of the read operation.

703: The DMA engine returns a response message of the data migration request to the CPU after receiving the data migration request of the CPU, and the CPU does not perform timeout counting on the data migration request after receiving the response message of the data migration request, so as to ensure that other messages cached in the CPU will not cause the CPU to generate an MCE reset due to accumulation.

704: The DMA engine initiates a read request to the SSD device, where the read request carries the source address of the read operation and the read operation is used to request a value of a register corresponding to the source address of the read operation to be read into a cache of the DMA engine.

705: The DMA engine determines whether the read request is successfully executed; if the read request is successfully executed, performs step 706; and if the read request fails to be executed, performs step 709.

706: The DMA engine writes data in its own cache into the destination address of the read operation according to a write request.

707: The DMA engine sends a first notification message to the CPU, where the first notification message may be first Message Signaled Interrupts (MSI) interruption for notifying the CPU that the access is complete.

708: The CPU reads the data from the destination address of the read operation after receiving the first MSI interruption message and may notify the drive module of the SSD device that the access is complete.

709: The DMA engine sends a second notification message to the CPU, where the second notification message may be second MSI interruption for notifying the CPU that the access fails.

710: The CPU executes subsequent processing for an access failure after receiving the second MSI interruption message.

The subsequent processing of an access failure may include initiating a diagnosis on the DMA engine to determine whether the DMA engine is faulty; if the DMA engine is faulty, resetting, by the CPU, the DMA engine or sending a notification indicating that the DMA engine is faulty, so as to recover the fault of the DMA engine; and if the DMA engine is not faulty, determining that a cause of the access failure is that the SSD device is offline abnormally, and stopping, by the CPU, the access to the SSD device.

Further, the CPU may further instruct the drive module of the SSD device to stop the access to the SSD device.

Figure 8:
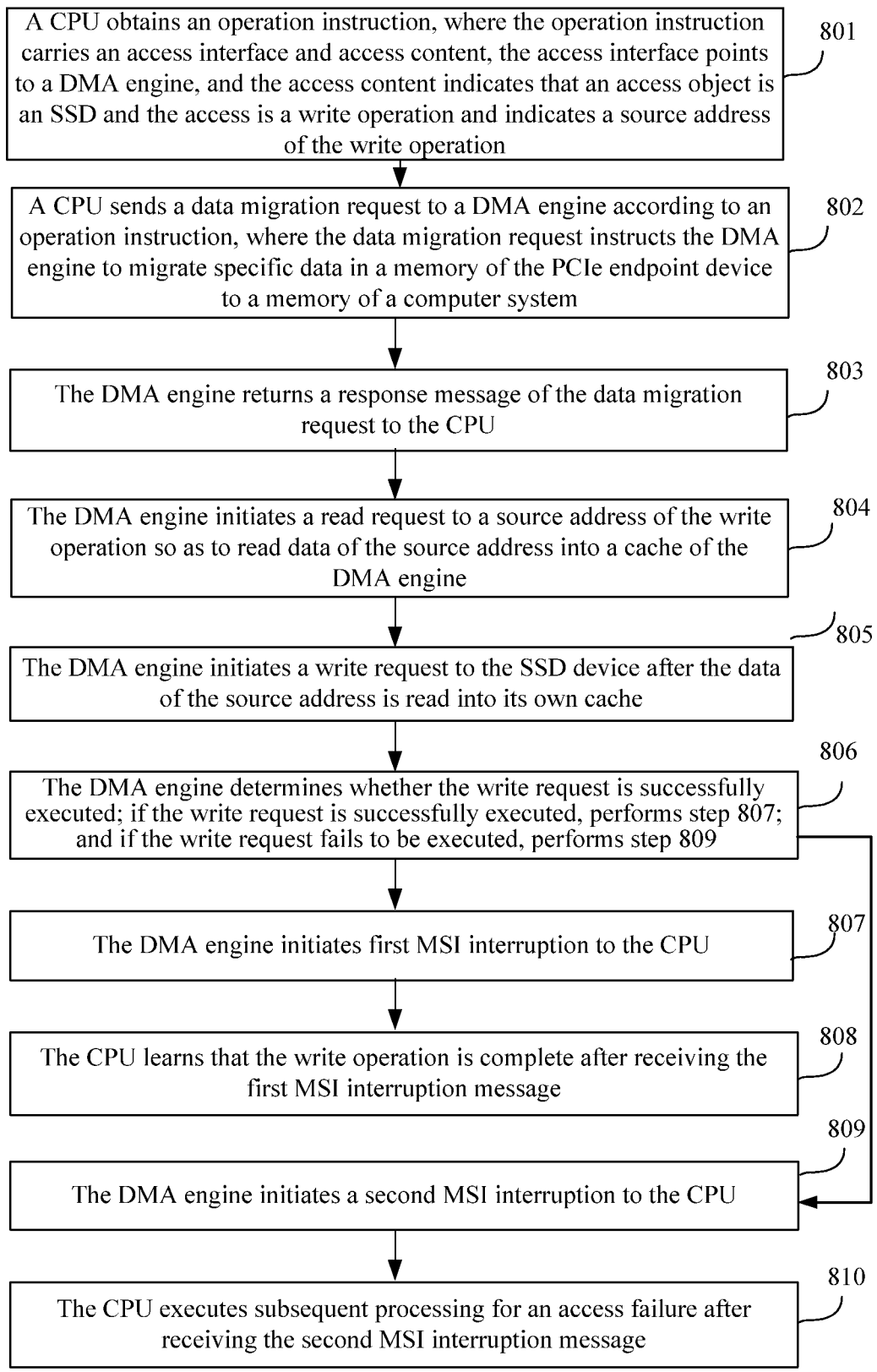
FIG. 8 is a flowchart of another method according to an embodiment of the present invention.

In another aspect, with reference to the embodiment of a computer system shown in FIG. 3 or FIG. 4, when an access proxy is implemented using a DMA engine, an upper layer application module generates a write operation demand for the SSD, a specific access process is shown in FIG. 8, including the following steps:

801: A CPU acquires an operation instruction generated by a drive module of the SSD, where the operation instruction carries an access interface and access content, the access interface points to the DMA engine, and the access content indicates that an access object is the SSD device and the access is a write operation, and indicates a source address and a destination address of the write operation.

A detailed implementation method of the operation instruction sent by the drive module to the CPU may further be in another manner. For example, the operation instruction carries indications indicating that the access object is the SSD and the access is a write operation and indicating the source address and the destination address of the write operation; in addition, one indication is newly added in the operation instruction to instruct access to the SSD to be implemented by operating the DMA engine.

802: The CPU sends an access request to the DMA engine according to the operation instruction of the drive module of the SSD, where the data migration request is used to instruct the DMA engine to migrate specific data in a memory of the computer system to a memory of the PCIe endpoint device.

The CPU sends a data migration request to the DMA engine after acquiring the operation instruction of the drive module of the SSD, where the data migration request indicates the source address, the destination address, and a length of the write operation, so as to instruct the DMA engine to migrate data of the length of the write operation from the source address of the write operation to the destination address of the write operation.

803: The DMA engine returns a response message of the data migration request to the CPU after receiving the data migration request of the CPU.

804: The DMA engine initiates a read request to the source address of the write operation so as to read data of the source address into a cache of the DMA engine.

805: The DMA engine initiates a write request to the SSD device after the data of the source address is read into its own cache, where the write request carries the destination address of the write operation and the write request is used to write data in the cache of the DMA engine into a register corresponding to the destination address.

806: The DMA engine determines whether the write request is successfully executed; if the write request is successfully executed, performs step 807; and if the write request fails to be executed, performs step 809.

807: The DMA engine initiates first MSI interruption to the CPU for notifying the CPU that the access is complete.

808: The CPU learns that the write operation is complete after receiving the first MSI interruption message and may further notify the drive module of the SSD device that the access is complete.

809: The DMA engine initiates second MSI interruption to the CPU for notifying the CPU that the access fails.

810: The CPU executes subsequent processing for an access failure after receiving the second MSI interruption message.

The subsequent processing of an access failure may include initiating a diagnosis on the DMA engine to determine whether the DMA engine is faulty; if the DMA engine is faulty, resetting, by the CPU, the DMA engine or sending a notification indicating that the DMA engine is faulty, so as to recover the fault of the DMA engine; and if the DMA engine is not faulty, determining that a cause of the access failure is that the SSD device is offline abnormally, and stopping, by the CPU, the access to the SSD device.

The CPU may further instruct the drive module of the SSD device to stop the access to the SSD device.

Processes shown in FIG. 7 and FIG. 8 describe method processes for a DMA engine to complete reading or writing on an SSD device in the embodiments of the present invention. In the read or write method, the DMA engine, in place of the CPU, accesses the PCIe endpoint device and returns a response message of the access request to the CPU, so that the CPU does not generate an MCE error and a reset of the entire system is avoided. Further, when the DMA engine fails to migrate data from the SSD device, the DMA engine notifies the CPU of a message of an access failure, the CPU performs a fault diagnosis and when determining that the access failure occurs because the SSD device is directly removed from the system or is faulty, stop access to the SSD device, thereby avoiding a waste of resources that is caused when the system continues to perform repeated access that cannot be successful.

Figure 9:
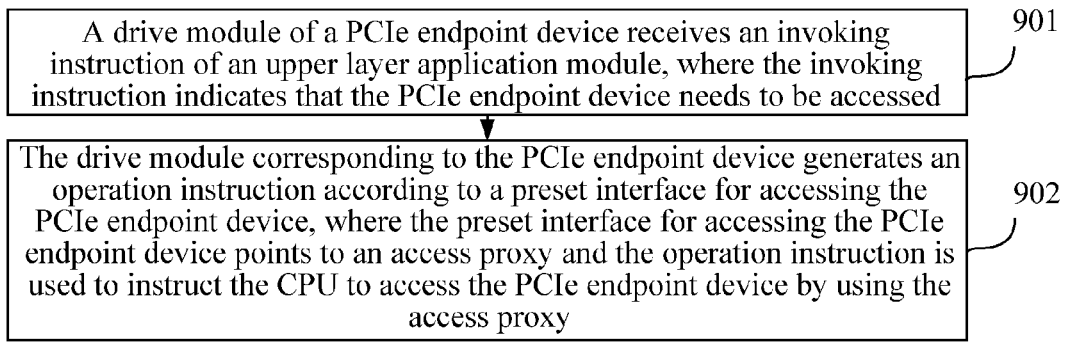
FIG. 9 is a flowchart of another method according to an embodiment of the present invention.

In addition, in this embodiment of the present invention, a method for a CPU to access a PCIe endpoint device may be changed by upgrading or improving a drive module corresponding to the PCIe endpoint device or a HOS. If the drive module corresponding to the PCIe endpoint device is used to change the method for a CPU to access a PCIe endpoint device, the following process shown in FIG. 9 may be included:

901: The drive module for the PCIe endpoint device receives an invoking instruction of an upper layer application module, where the invoking instruction indicates that the PCIe endpoint device needs to be accessed.

902: The drive module corresponding to the PCIe endpoint device generates an operation instruction according to a preset interface for accessing the PCIe endpoint device, where the preset interface for accessing the PCIe endpoint device points to an access proxy, and the operation instruction is used to instruct the CPU to access the PCIe endpoint device using the access proxy.

Figure 10:
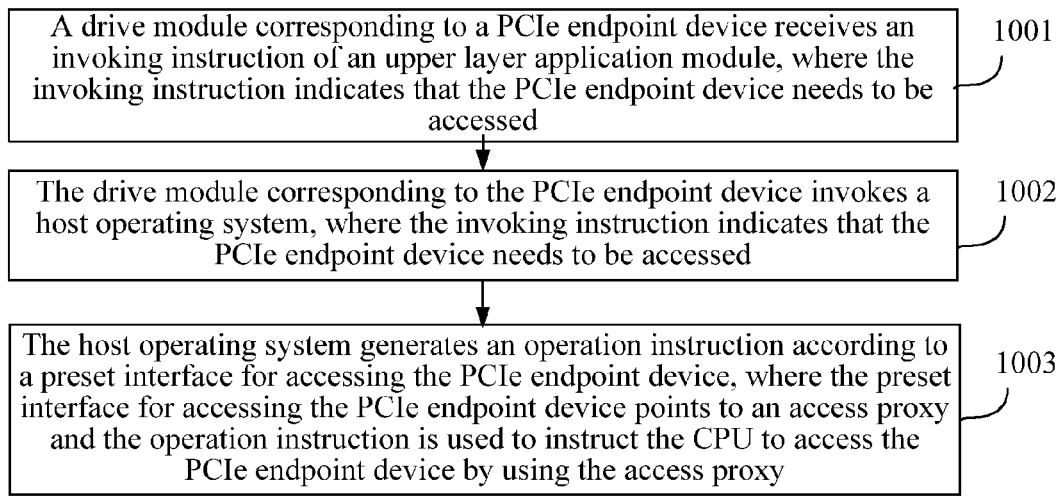
FIG. 10 is a flowchart of another method according to an embodiment of the present invention.

If a HOS is configured to change the method for a CPU to access a PCIe endpoint device, the following process shown in FIG. 10 may be included:

1001: The drive module corresponding to the PCIe endpoint device receives an invoking instruction of an upper layer application module, where the invoking instruction indicates that the PCIe endpoint device needs to be accessed.

1002: The drive module corresponding to the PCIe endpoint device invokes the HOS, where the invoking instruction indicates that the PCIe endpoint device needs to be accessed.

1003: The HOS generates an operation instruction according to a preset interface for accessing the PCIe endpoint device, where the preset interface for accessing the PCIe endpoint device points to an access proxy, and the operation instruction is used to instruct the CPU to access the PCIe endpoint device using the access proxy.

Apparatus in an Embodiment of the Present Invention

Figure 11:
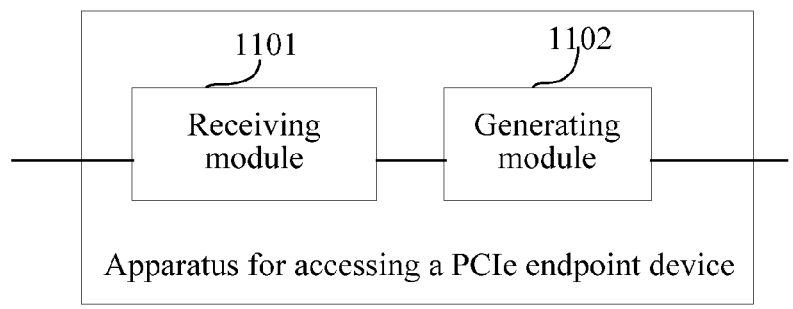
FIG. 11 is a composition diagram of an apparatus for accessing a PCIe endpoint device according to an embodiment of the present invention.

As shown in FIG. 11, an apparatus for accessing a PCIe endpoint device provided in an embodiment of the present invention includes a receiving module 1101 configured to receive an invoking instruction, where the invoking instruction indicates that the PCIe endpoint device needs to be accessed; and a generating module 1102 configured to generate, according to a preset interface for accessing the PCIe endpoint device, an operation instruction for accessing the PCIe endpoint device, where the preset interface for accessing the PCIe endpoint device points to an access proxy, and the operation instruction is used to instruct the CPU to access the PCIe endpoint device using the access proxy.

The access apparatus may be a drive module of the PCIe endpoint device or a HOS of the computer system.

Figure 12:
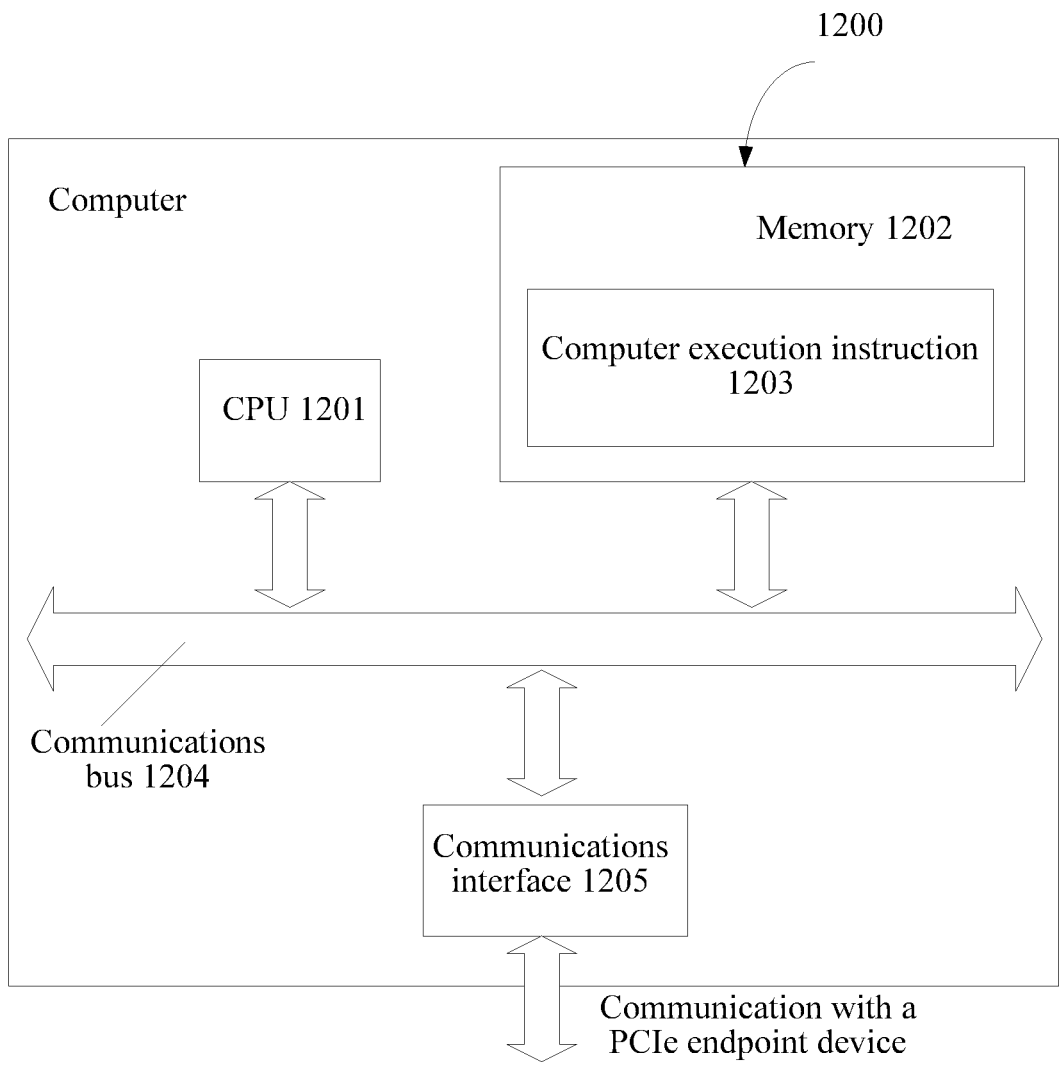
FIG. 12 is a composition diagram of a computer according to an embodiment of the present invention.

FIG. 12 is a structural composition diagram of a computer 1200 according to an embodiment of the present invention. The computer in this embodiment of the present invention may include a CPU 1201, a memory 1202, a communications bus 1204, and a communications interface 1205. The CPU 1201, the memory 1202, and the communications interface 1205 connect and complete communications between each other using the communications bus 1204.

The CPU 1201 may be a single-core or multi-core CPU or a specific integrated circuit, or is configured as one or more integrated circuits in this embodiment of the present invention.

The memory 1202 may be a high-speed random access memory (RAM) or may be a non-volatile memory, such as at least one magnetic disk memory.

The memory 1202 is configured to store a computer execution instruction 1203. The computer execution instruction 1203 may include a program code.

When the computer is running, the CPU 1201 runs the computer execution instruction 1203 and a method process shown in any one of FIG. 5 to FIG. 10 may be executed.

Computer System for Accessing a PCIe Endpoint Device

When a PCIe endpoint device is removed from a computer system, it is possible that it is inserted to the computer system again subsequently. In addition, a condition that a new PCIe endpoint device needs to connect a computer system in running state also exists. For example, as popularity of an SSD device, a phenomenon that a user directly inserts or removes an SSD device occurs more and more frequently. In the prior art, when any PCIe endpoint device is powered on and connects to the system, a CPU initiates a scanning and resource allocating process for the PCIe endpoint device; in a process where the CPU scans the newly powered-on PCIe endpoint device, if the PCIe endpoint device is directly removed from the system, it is possible that the CPU reports an MCE error, which causes a system reset. To avoid the problem, this embodiment of the present invention puts forward a new solution for allocating resources to a PCIe endpoint device, so that the CPU does not need to scan or allocate resources to the newly powered-on PCIe endpoint device when the PCIe endpoint device is newly powered-on and connects to the system.

During initiation of the computer system, a BIOS needs to reserve resources for each device in the system. For the PCIe endpoint device, the BIOS scans each port for accessing a PCIe endpoint device. When finding a PCIe endpoint device through scanning, the BIOS reads a corresponding register of the PCIe endpoint device and reserves resources correspondingly according to a requirement of the PCIe endpoint device, for example, reserves bus resources and memory address resources. The port for accessing a PCIe endpoint device described in this embodiment of the present invention may be a downlink port of a PCIe exchanger or a downlink port of a northbridge in the system.

In the solution for allocating resources to a PCIe endpoint device provided in this embodiment of the present invention, a resource reservation method for the BIOS of the computer system is different from that in the prior art. During initiation of the computer system, the BIOS does not reserve resources according to an actual demand of a PCIe endpoint device actually found through scanning, but reserves a specific share of resources for each port for accessing a PCIe endpoint device, where the specific share is greater than or equal to a required resource quantity of the PCIe endpoint device, and preferentially the specific share may be a resource quantity demand of a type of PCIe endpoint device that has a maximum resource quantity demand. For example, the BIOS scans each port for accessing a PCIe endpoint device in the computer system, and no matter whether a PCIe endpoint device is found through scanning and no matter which type of PCIe endpoint device is found through scanning, specifies that each port for accessing a PCIe endpoint device may be subsequently accessed by the type of PCIe endpoint device that has a maximum resource quantity demand. If 10 types of PCIe endpoint devices may be used in the current system and the one that has a maximum resource quantity demand is an SSD device that requires 10M memory resources that cannot be prefetched and 3 PCIe buses, the BIOS reserves, for each port for accessing a PCIe endpoint device, 10M resources that cannot be prefetched and 3 PCIe bus resources.

Secondly, after the BIOS reserves resources, a PCIe management module of the computer system allows all PCIe endpoint devices managed by one CPU in the computer system and the PCIe exchanger to constitute a PCIe field and configures a corresponding PCIe tree for the PCIe field, where the PCIe tree is used to describe each layer of connection relationships from each PCIe endpoint device in the PCIe field to the CPU and a resource configuration condition of each PCIe endpoint device. Because the BIOS has reserved a specific share of resources for each port for accessing a PCIe endpoint device, when loading each port for accessing a PCIe endpoint device, the PCIe management module does not scan an actual resource quantity demand of the PCIe endpoint device of the port, but allocates resources according to a resource reservation condition of the BIOS, that is, allocates a specific share of resources reserved by the BIOS to each port for accessing a PCIe endpoint device, and records a condition of allocating the specific share of resources in the PCIe tree.

Further, when a PCIe endpoint device is faulty or is offline from the computer system, the PCIe management module does not release the specific share of resources allocated to the powered-off PCIe endpoint device when determining that the PCIe endpoint device is offline. In addition, architecture of the PCIe tree remains unchanged, that is, the connection relationship and the resource configuration condition of the offline PCIe endpoint device are retained in the PCIe tree. In this way, because the resources and the connection relationship of the PCIe endpoint device have been configured in the PCIe field, when the PCIe endpoint device is powered on and accesses the PCIe field, the PCIe management module notifies a corresponding drive module that the PCIe endpoint device is powered on and the PCIe endpoint device completes access to the PCIe field of the computer system. In this solution, when the PCIe endpoint device is powered on, the CPU does not need to scan the PCIe endpoint device, thereby avoiding a reset of the entire system caused by an MCE error that may occur when the PCIe endpoint device accesses the computer system.

Persons of ordinary skill in the art may understand that each aspect of the present invention or a possible implementation manner of each aspect may be implemented as a system, a method, or a computer program product. Therefore, each aspect of the present invention or possible implementation manners of each aspect may use forms of a complete hardware embodiment, a complete software embodiment (including firmware, resident software, and the like), or an embodiment combining software and hardware, which is collectively called "circuit", "module", or "system" herein. In addition, each aspect of the present invention or possible implementation manners of each aspect may use a form of a computer program product, where the computer program product refers to a computer-readable program code in a computer-readable medium.

The computer-readable medium may be a computer-readable signal medium or a computer-readable memory medium. The computer-readable memory medium includes but is not limited to an electronic, magnetic, optical, electromagnetic, infrared, or semi-conductive system, device, or apparatus, or any appropriate combination thereof, such as a RAM, a read-only memory (ROM), an erasable programmable read only memory (EPROM or Flash memory), an optical fiber, and a portable read-only memory (CD-ROM).

A processor of a computer reads the computer-readable program code stored in the computer-readable medium, so that the processor is capable of executing function actions stipulated in each step or combinations of each step in a flowchart and an apparatus implementing function actions stipulated in each block or a combination of blocks in the block diagram is generated.

The computer-readable program code may be completely executed on a computer of a user, partially executed on the computer of the user, partially executed on the computer of the user and partially executed on a remote computer when functioning as an independent software package, or completely executed on the remote computer or a server. It should be also noted that, in some alternative implementation solutions, functions indicated in each step in the flowchart or in each block of a block diagram may not occur in a sequence indicated in the flowchart or the diagram. For example, relying on involved functions, two steps or two blocks shown one after another may be executed at the same time in practice, or sometimes the blocks are executed in a converse sequence.

Persons of ordinary skill in the art may be aware that, in combination with the examples described in the embodiments that are disclosed in this specification, units and algorithm steps can be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access proxy, wherein the access proxy applies to a computer system, wherein the computer system comprises a processor and a peripheral component interconnect express (PCIe) bus, wherein the PCIe bus connects to at least one PCIe endpoint device, wherein the access proxy connects to the processor and the PCIe endpoint device, and wherein the access proxy is implemented by a direct memory access (DMA) engine, and wherein the DMA engine is configured to:
   receive a data migration request for accessing the PCIe endpoint device from the processor;
   return a response message of the data migration request to the processor before performing data migration; and
   migrate, according to the data migration request, data in a memory of the PCIe engine to a memory of the computer system, or migrate data in the memory of the computer system to the memory of the PCIe endpoint device.

2. The access proxy according to claim 1, wherein the response message of the data migration request returned by the DMA engine is a first notification message to the processor, and wherein the first notification message indicates that access to the PCIe endpoint device is successful.

3. The access proxy according to claim 1, wherein the response message of the data migration request returned by the DMA engine is a second notification message to the processor, and wherein the second notification message indicates that the access to the PCIe endpoint device fails.

4. The access proxy according to claim 1, wherein the DMA engine is packaged with the processor.

5. The access proxy according to claim 1, wherein the DMA engine fixedly connects to the processor, and wherein the DMA engine is configured to send the response message of the data migration request to the processor using the fixed connection with the processor.

6. The access proxy according to claim 1, wherein that the DMA engine fixedly connects to the processor comprises that the DMA engine is welded on a printed circuit board (PCB) connecting to the processor or the DMA engine fixedly connects to the processor using connection firmware.

7. A peripheral component interconnect express (PCIe) exchanger, wherein the PCIe exchanger applies to a computer system, wherein the computer system comprises a processor and a PCIe bus, wherein the PCIe bus connects to at least one PCIe endpoint device, wherein an upstream port of the PCIe exchanger connects to the processor through the PCIe bus and a downstream port of the PCIe exchanger connects to the PCIe endpoint device through the PCIe bus, wherein the PCIe exchanger further comprises an access proxy, wherein the access proxy is implemented by a direct memory access (DMA) engine, and wherein the DMA engine configured to:
   receive a data migration request for accessing the PCIe endpoint device from the processor;
   return a response message of the data migration request to the processor before performing data migration; and
   migrate, according to the data migration request, data in a memory of the PCIe engine to a memory of the computer system, or migrate data in the memory of the computer system to the memory of the PCIe endpoint device.

8. The PCIe exchanger according to claim 7, wherein the response message of the data migration request returned by the DMA engine is a first notification message to the processor, and wherein the first notification message indicates that access to the PCIe endpoint device is successful.

9. The PCIe exchanger according to claim 7, wherein the response message of the data migration request returned by the DMA engine is a second notification message to the processor, and wherein the second notification message indicates that the access to the PCIe endpoint device fails.

10. The PCIe exchanger according to claim 7, wherein the PCIe exchanger is packaged with the processor.

11. The PCIe exchanger according to claim 7, wherein the PCIe exchanger fixedly connects to the processor, and wherein the access proxy is configured to send the response message of the data migration request to the processor using the fixed connection with the processor.

12. The PCIe exchanger according to claim 7, wherein that the PCIe exchanger fixedly connects to the processor comprises that the access proxy is welded on a printed circuit board (PCB) connecting to the processor or the access proxy fixedly connects to the processor using connection firmware.

13. A computer system, wherein the computer system comprises:
   a processor; and
   a peripheral component interconnect express (PCIe) bus, wherein the PCIe bus connects to at least one PCIe endpoint device,
   wherein an access proxy is implemented by a direct memory access (DMA) engine,
   wherein the DMA engine connects to the processor and the PCIe endpoint device, and
   wherein the DMA engine is configured to:
      receive a data migration request-for accessing the PCIe endpoint device from the processor;
      return a response message of the data migration request to the processor before performing data migration; and
      migrate, according to the data migration request, data in a memory of the PCIe engine to a memory of the computer system, or migrate data in the memory of the computer system to the memory of the PCIe endpoint device.

14. The computer system according to claim 13, wherein the DMA engine is packaged with the processor.

15. The computer system according to claim 13, wherein the DMA engine fixedly connects to the processor, and wherein the DMA engine is configured to send the response message of the data migration request to the processor using the fixed connection with the processor.

16. The computer system according to claim 13, wherein that the DMA engine fixedly connects to the processor comprises that the DMA engine is welded on a printed circuit board (PCB) connecting to the processor or the DMA engine fixedly connects to the processor using connection firmware.

* * * * *